United States Patent
Chiu (10) Patent No.: US 8,619,433 B2
(45) Date of Patent: Dec. 31, 2013

(54) PORTABLE ELECTRONIC DEVICE

(75) Inventor: Szu-Tang Chiu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 396 days.

(21) Appl. No.: 12/777,443

(22) Filed: May 11, 2010

(65) Prior Publication Data

US 2010/0296260 A1 Nov. 25, 2010

(30) Foreign Application Priority Data

May 25, 2009 (TW) ................................ 98117329 A (51) Int. Cl.
*H05K 7/02* (2006.01)
*H05K 7/04* (2006.01)
*H05K 7/00* (2006.01)
*H05K 5/00* (2006.01)
*G06F 1/16* (2006.01)
*H01R 39/00* (2006.01)
*H01R 13/62* (2006.01)
*H04M 1/00* (2006.01)

(52) U.S. Cl.
USPC ............... 361/807; 361/679.09; 361/679.26; 361/679.39; 439/13; 439/305; 455/575.4

(58) Field of Classification Search
USPC ............ 361/737, 764, 807, 144, 727, 679.09, 361/679.26, 679.35, 679.39, 755; 439/131, 439/144, 172, 305, 133; 220/223; D14/480.7; 335/291, 295, 177, 182, 335/183
See application file for complete search history.

(56) References Cited

U.S. PATENT DOCUMENTS

| | | | | |
|---|---|---|---|---|
| 4,265,002 A | * | 5/1981 | Hosken | 24/303 |
| 5,367,891 A | * | 11/1994 | Furuyama | 63/29.2 |
| 6,922,333 B2 | * | 7/2005 | Weng et al. | 361/679.2 |
| 7,361,032 B2 | | 4/2008 | Loftus | |
| 7,523,527 B2 | * | 4/2009 | Garber | 24/303 |
| 7,581,417 B1 | * | 9/2009 | Chen | 439/133 |
| 2007/0252010 A1 | | 11/2007 | Gonzalez et al. | |
| 2008/0232061 A1 | * | 9/2008 | Wang et al. | 361/686 |
| 2009/0021333 A1 | * | 1/2009 | Fiedler | 335/285 |
| 2009/0124104 A1 | * | 5/2009 | Zhu et al. | 439/131 |
| 2009/0275224 A1 | * | 11/2009 | Ni et al. | 439/131 |

FOREIGN PATENT DOCUMENTS

| | | |
|---|---|---|
| TW | I241513 | 10/2005 |
| TW | M353461 | 3/2009 |

* cited by examiner

*Primary Examiner* — Chau Nguyen
*Assistant Examiner* — Roshn Varghese
(74) *Attorney, Agent, or Firm* — Rabin & Berdo, P.C.

(57) ABSTRACT

A portable electronic device including a casing, a rotating part, a pivot unit and a magnet set is disclosed. The pivot unit is pivotally connected to the casing and the rotating part. The magnet set includes a first magnet, a second magnet and a third magnet disposed in a base of the casing. The first magnet and the second magnet are disposed at the rotating part, and the magnetism of the first magnet is different from the magnetism of the second magnet. The magnetism of the third magnet is the same as the magnetism of the first magnet or the magnetism of the second magnet. When the rotating part is rotated relative to the casing, the magnet set generates magnetic attraction or magnetic repulsion so as to lead an electronic component of the casing in the casing or out of the casing.

20 Claims, 13 Drawing Sheets

PORTABLE ELECTRONIC DEVICE

This application claims the benefit of Taiwan application Serial No. 98117329, filed May 25, 2009, the subject matter of which is incorporated herein by reference.

BACKGROUND OF THE INVENTION

1. Field of the Invention

The invention relates to a portable electronic device and, more particularly, to a portable electronic device which uses magnetic attraction and magnetic repulsion of a magnet set to attract or repulse an electronic component.

2. Description of the Related Art

A functional component of a portable electronic device such as a memory in a memory disk needs to be electrically connected to other electronic devices to share or transmit data. Thus, the portable electronic device usually has an exposed electrical connecting port, and a protecting cover is used to cover the exposed electrical connecting port. When the portable electronic device is not used, the protecting cover may protect the electrical connecting port of the portable electronic device.

However, the protecting cover and the portable electronic device are usually separated, and when the portable electronic device needs to be electrically connected to other electronic devices, the protecting cover is taken off. Thus, it is easy to loss the protecting cover. In addition, the casing of the protecting cover and the casing of the portable electronic device usually have corresponding fastening dots to make the protecting cover and the electrical connecting port fastened with each other when the protecting cover covers the electrical connecting port. However, the fastening dots are usually designed to be simple, and the protecting cover is easy to drop or be missed when it is struck slightly.

BRIEF SUMMARY OF THE INVENTION

The invention relates to a portable electronic device. An electronic component such as an electrical connecting port is retracted in a casing and protected by magnetic force and simple rotating actions. Thus, additional protecting elements for covering the electrical connecting port are not needed.

According to an aspect of the invention, a portable electronic device is provided. The portable electronic device includes a casing, a rotating part, a pivot unit and a magnet set. The casing has an opening and includes a base and an electronic component. The base is slidably disposed in the casing, and the electronic component is disposed on the base. The pivot unit is pivotally connected to the casing and the rotating part. The magnet set includes a first magnet, a second magnet and a third magnet. The first magnet and the second magnet are disposed at one of the base and the rotating part, and the magnetism of the first magnet is different from the magnetism of the second magnet. The third magnet is disposed at one of the base and the rotating part, and the magnetism of the third magnet is the same as the magnetism of the first magnet or the magnetism of the second magnet. When the rotating part is rotated relative to the casing, the magnet set generates magnetic attraction or magnetic repulsion so as to lead the electronic component in the casing or out of the casing.

According to another aspect of the invention, a portable electronic device is provided. The portable electronic device includes a casing, a rotating part, a pivot unit and a magnet set. The casing has a second side wall and an opening and includes a base slidably disposed in the casing and an electronic component disposed on the base. The pivot unit is pivotally connected to the casing and the rotating part. The magnet set includes a first magnet, a second magnet and a third magnet. The first magnet and the second magnet are disposed at one of the base and the second side wall, and magnetism of the first magnet and magnetism of the second magnet are different. The third magnet is disposed at the other one of the base and the second side wall, and magnetism of the third magnet is the same as the magnetism of the first magnet or the magnetism of the second magnet. When the rotating part is rotated relative to the casing, the magnet set generates magnetic attraction or magnetic repulsion so as to lead the electronic component in the casing or out of the casing.

These and other features, aspects and advantages of the present invention will become better understood with regard to the following description, appended claims, and accompanying drawings.

DETAILED DESCRIPTION OF THE EMBODIMENTS

The First Embodiment

Figure 1:
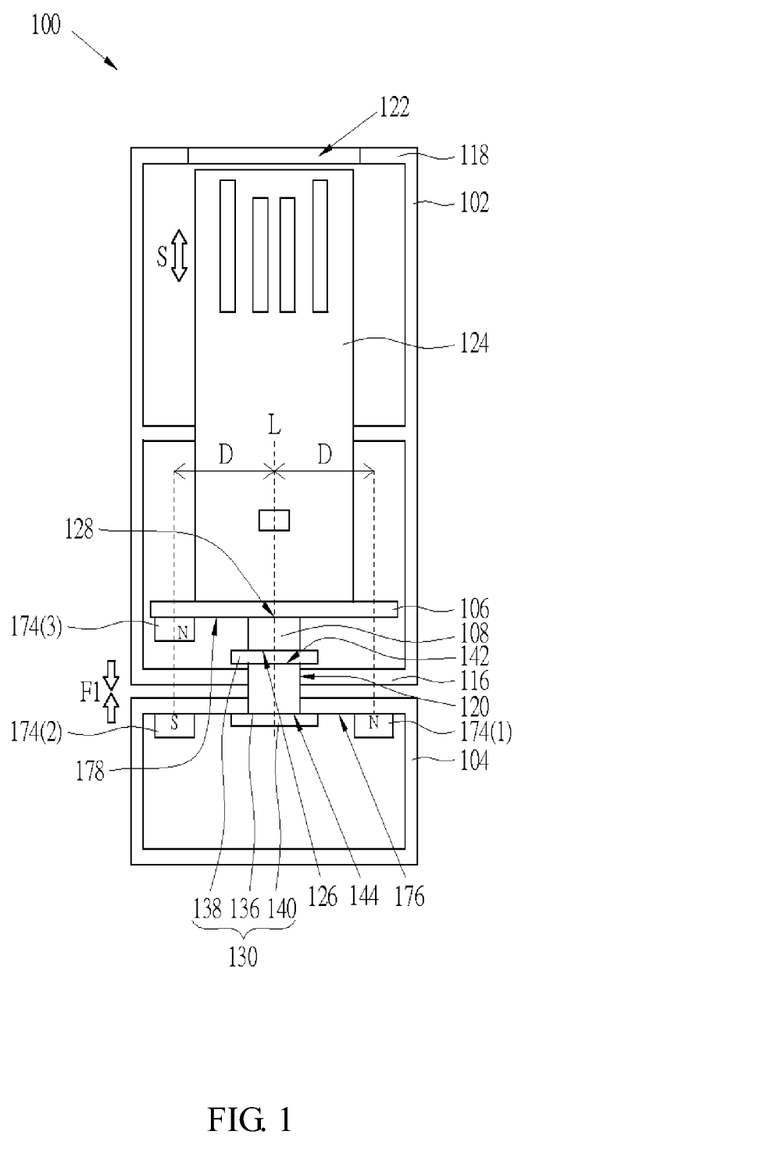
FIG. 1 is a perspective diagram showing a portable electronic device in the first embodiment of the invention.

FIG. 1 is a perspective diagram showing a portable electronic device in the first embodiment of the invention. The portable electronic device is illustrated as a common electronic storage device such as a memory disk. As shown in FIG. 1, the memory disk 100 includes a casing 102, a rotating part 104, a pivot unit 130, a magnet set 174 and a connecting rod 108. The casing 102 includes a base 106 and an electronic component 124. The magnet set 174 includes a first magnet 174 (1), a second magnet 174 (2) and a third magnet 174 (3). The rotating part 104 is connected to the casing 102 by the pivot unit 130 to make the casing 102 rotatably connected to the rotating part 104 without detaching. The connecting rod 108 is connected to the pivot unit 130 and the base 106.

The electronic component 124 is located at the base 106 and is adapted to move out of the casing 102 via the opening 122 on the first side wall 118 of the casing 102. Detailedly, the electronic component 124 of the memory disk 100 in the embodiment is slidably contained in the casing 102 to be protected, and it also may be led out of the casing 102 to be operated electrically. The electronic component 124 may be an electrical connecting port having a universal serial bus (USB) interface.

As shown in FIG. 1, the electronic component 124 is located at the base 106, and the base 106 is slidably disposed in the casing 102, and the sliding direction S is substantially vertical to the second side wall 116 of the casing 102. The second side wall 116 corresponds to the first side wall 118.

As shown in FIG. 1, the pivot unit 130 includes a pivot 136 and a first connecting portion 138 and a corresponding second connecting portion 140. The pivot 136 passes through a through hole 120 on the second side wall 116, and the first end 142 and the second end 144 of the pivot 136 are fixed to the first connecting portion 138 and the second connecting portion 140, respectively. The first connecting portion 138 is located in the casing 102 and abuts against the second side wall 116, and the second connecting portion 140 is located in the rotating part 104 and fixed to the rotating part 104. Thus, the casing 102 and the rotating part 104 are not detached from each other. In addition, when the rotating part 104 is rotated, the pivot unit 130 and the connecting rod 108 fixed to the pivot unit 130 are rotated therewith.

The first end 126 of the connecting rod 108 is fixed to the first connecting portion 138. Thus, when the rotating part 104 is rotated, the pivot unit 130 fixed to the rotating part 104 may drive the connecting rod 108 to rotate. The second end 128 of the connecting rod 108 is movably connected to the base 106, and thus when the connecting rod 108 is rotated, the base 106 is not rotated therewith. Thus, when the rotating part 104 is rotated, the base 106 and the third magnet 174(3) on the base 106 are not rotated therewith. Therefore, by the rotation of the rotating part 104, the first magnet 174(1) may correspond to the third magnet 174(2), or the second magnet 174(2) corresponds to the third magnet 174(3).

Besides, the first magnet 174(1) and the second magnet 174(2) are disposed in the rotating part 104, and the first magnet 174(1) and the second magnet 174(2) are disposed at an inner surface 176 of the rotating part 104, and the inner surface 176 is adjacent to the casing 102. The third magnet 174(3) is disposed at a surface 178 of the base 106, and the surface is towards the rotating part 104. In the embodiment, the pole of the first magnet 174(1) and the pole of the third magnet 174(3) are, for example, the same, and the pole of the first magnet 174(1) is, for example, opposite to the pole of the second magnet 174(2). In the embodiment, the pole of the first magnet 174(1) and the pole of the third magnet 174(3) may be N, and the pole of the second magnet 174(2) may be S. Thus, when the rotating part 104 is rotated relative to the casing 102 to the position where the north pole (N-pole) of the first magnet 174(1) corresponds to the N-pole of the third magnet 174(3), magnetic repulsion F2 (not shown in FIG. 1) is generated between the third magnet 174(3) and the first magnet 174(1). Thus, the magnetic repulsion F2 may drive the base 106 to slide in the direction away from the second side wall 116. Therefore, the electronic component 124 passes through the opening 122 and is led out of the casing 102. When the rotating part 104 is rotated relative to the casing 103 to the position where the second magnet 174(2) corresponds to the third magnet 174(3), a magnetic attraction F1 is generated between the third magnet 174(3) and the second magnet 174(2). Thus, the magnetic attraction F1 may drive the base 106 to slide in the direction approaching the second side wall 116 to lead the electronic component 124 into the casing 102 (as shown in FIG. 1).

In FIG. 1, the distances D between the first magnet 174(1) and the rotating axis L of the rotating part 104, the second magnet 174(2) and the rotating axis L of the rotating part 104, and the third magnet 174(3) and the rotating axis L of the rotating part 104 are the same, and the central angle of the first magnet 174(1) and the second magnet 174(2) relative to the rotating axis is 180 degrees. Thus, when the rotating part 104 is rotated by 180 degrees relative to the casing 102, the electronic component 124 is driven by the magnetic attraction F1 or the magnetic repulsion F2 to be led into or out of the casing 102.

Figure 2:
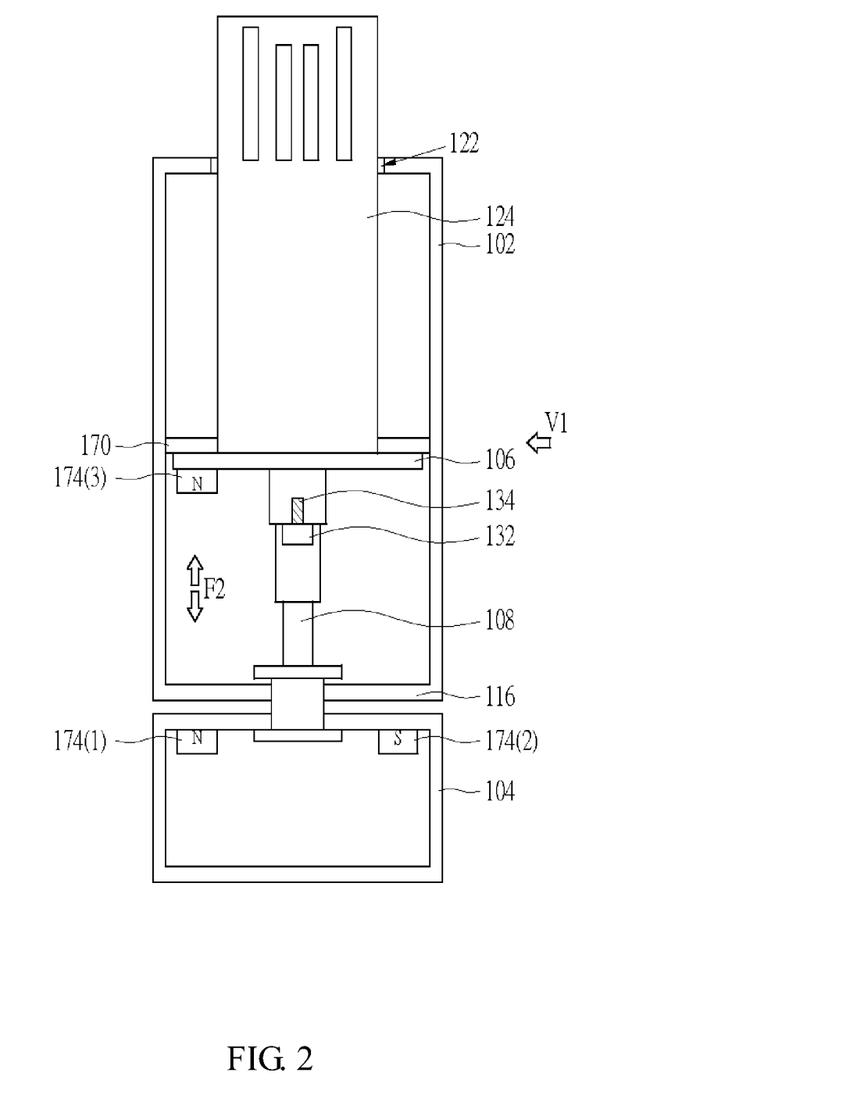
FIG. 2 is a perspective diagram showing the memory disk after the rotating part is rotated by 180 degrees.

FIG. 2 is a perspective diagram showing the memory disk after the rotating part is rotated by 180 degrees. When the rotating part 104 is rotated by 180 degrees, the first magnet 174(1) is driven to a position corresponding to the third magnet 174(3). Since the N-pole of the first magnet 174(1) corresponds to the N-pole of the third magnet 174(3), magnetic repulsion F2 is generated between the first magnet 174(1) and the third magnet 174(3). The magnetic repulsion F2 pushes the base 106 and the electronic component 124 to the direction away from the second side wall 116 to lead the electronic component 124 out of the casing 102. Furthermore, when the user wants to electrically connect the electronic component 124 to an external device (not shown), he or she may rotate the rotating part 104 to the position in FIG. 2 from the position in FIG. 1. Thus, the electronic component 124 may be led out of the casing 102 by the magnetic repulsion F2, and the electronic component 124 may be electrically connected to the external device.

The memory disk 100 may have a sliding portion to lead the electronic component 124 to slide and lead the electronic component 124 out of the casing 102 more precisely via the opening 122 according to the fixed sliding direction. In addition, the memory disk 100 also may have a restricting portion 170, and it may be a structure protruding from the casing 102. Furthermore, when the magnetic attraction is acted on the base 106, the base 106 is restricted by the restricting portion 170. Then, the length of the part of the electronic component 124 protruding from the casing is limited.

Figure 3:
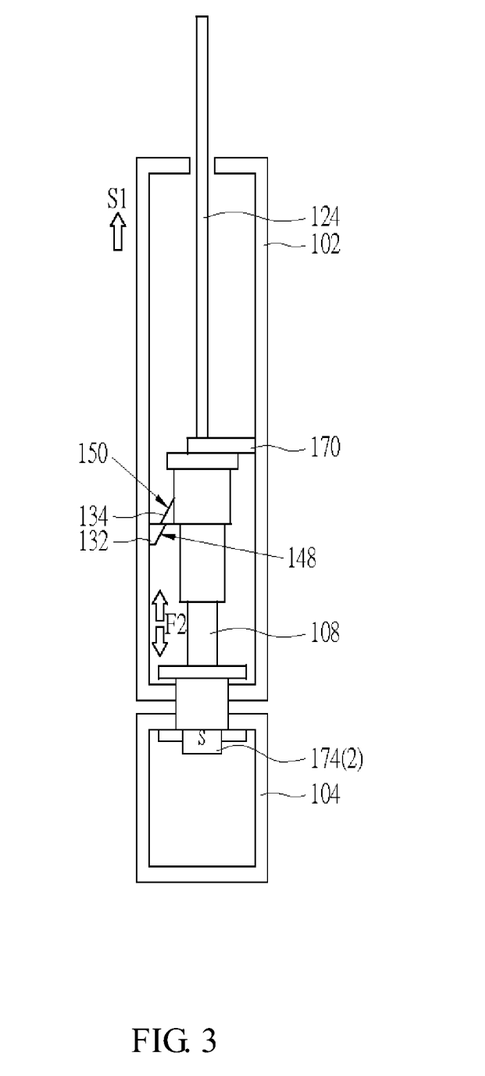
FIG. 3 is a perspective diagram showing the memory disk seen in the direction V1 in FIG. 2.

FIG. 3 is a perspective diagram showing the memory disk seen in the direction V1 in FIG. 2. The casing 102 further includes a first blocking portion 132, and the connecting rod 108 further includes a second blocking portion 134. When the N-pole of the first magnet 174(1) faces the N-pole of the third magnet 174(3), the base 106 may be pushed along the direction S1 by the magnetic repulsion F2. The second blocking portion 134 in the connecting rod 108 passes the first blocking portion 132 of the casing 102 along the direction S1, and the position of the second blocking portion 134 passing the first blocking portion 132 is shown in FIG. 3. At that moment, the first blocking portion 132 may block the second blocking portion 134.

The blocking force of the first blocking portion 132 applied to the second blocking portion 134 may resist the resistance of the external device when the electronic component 124 is connected to the external device. Thus, the electronic component 124 may be electrically connected to the external device smoothly.

The first blocking portion 132 may be made of flexible hard material such as plastic. The first blocking portion 132 has a first inclined plane 148, and the second blocking portion 134 has a second inclined plane 150. When the second blocking portion 134 passes the first blocking portion 132 along the direction S1, the second blocking portion 134 slightly contacts the first blocking portion 132. Thus, a small force should be acted on the second blocking portion 134 to allow the second blocking portion 134 pass the first blocking portion 132. In the embodiment, the magnetic repulsion F2 is large enough to make the second blocking portion 134 pass the first blocking portion 132, and thus the second blocking portion 134 passes the first blocking portion 132 to allow the first blocking portion 132 to block the second blocking portion 134.

Figure 4A:
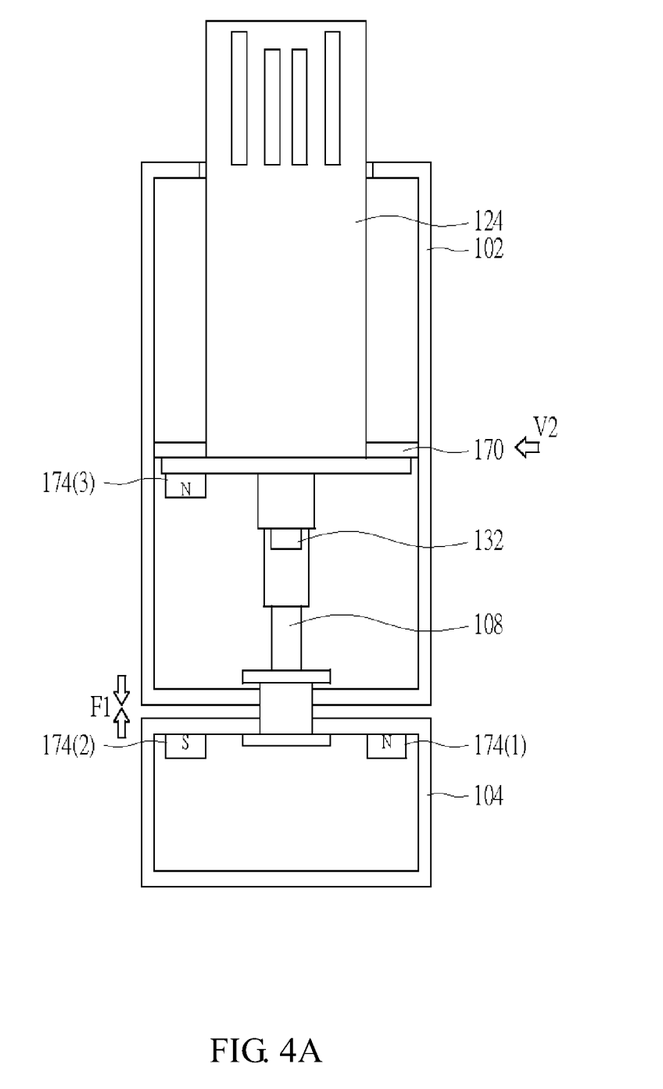
FIG. 4A is a perspective diagram showing the memory disk in FIG. 2 after the rotating part is rotated by 180 degrees.
Figure 4B:
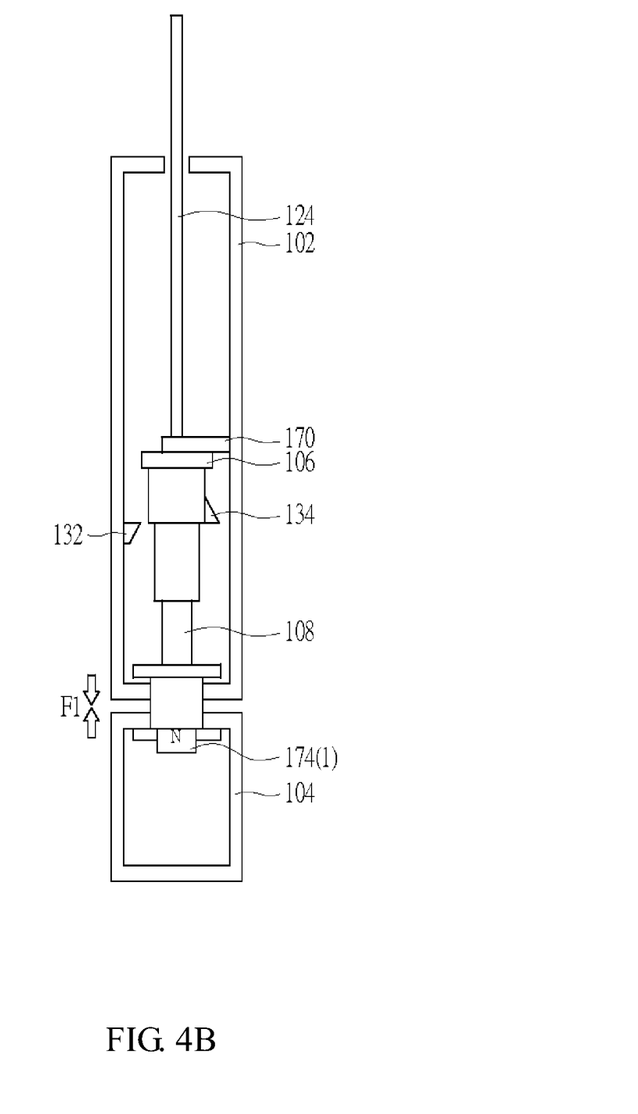
FIG. 4B is a perspective diagram showing the memory disk seen in the direction V2 in FIG. 4A.

In addition, containing the electronic component 124 in FIG. 3 in the casing 102 also may be achieved by rotating the rotating part 104. As shown in FIG. 4A and FIG. 4B. FIG. 4A is a perspective diagram showing the memory disk in FIG. 2 after the rotating part is rotated by 180 degrees, and FIG. 4B is a perspective diagram showing the memory disk seen in the direction V2 in FIG. 4A. When the rotating part 104 in FIG. 2 is rotated by 180 degrees, the south pole (S-pole) of the second magnet 174(2) corresponds to the N-pole of the third magnet 174(3) to generate magnetic attraction F1, as shown in FIG. 4A. The magnetic attraction F1 leads the electronic component 124 into the casing 102, as shown in FIG. 1.

As shown in FIG. 4B, when the second magnet 174(2) corresponds to the third magnet 174(3), the first blocking portion 132 and the second blocking portion 134 are staggered, and thus when the magnetic attraction F1 is acted on the base 106 to lead the base 106 into the casing 102, the base 106 and the electronic component 124 are not blocked, and they may be contained into the casing 102 smoothly.

Figure 5:
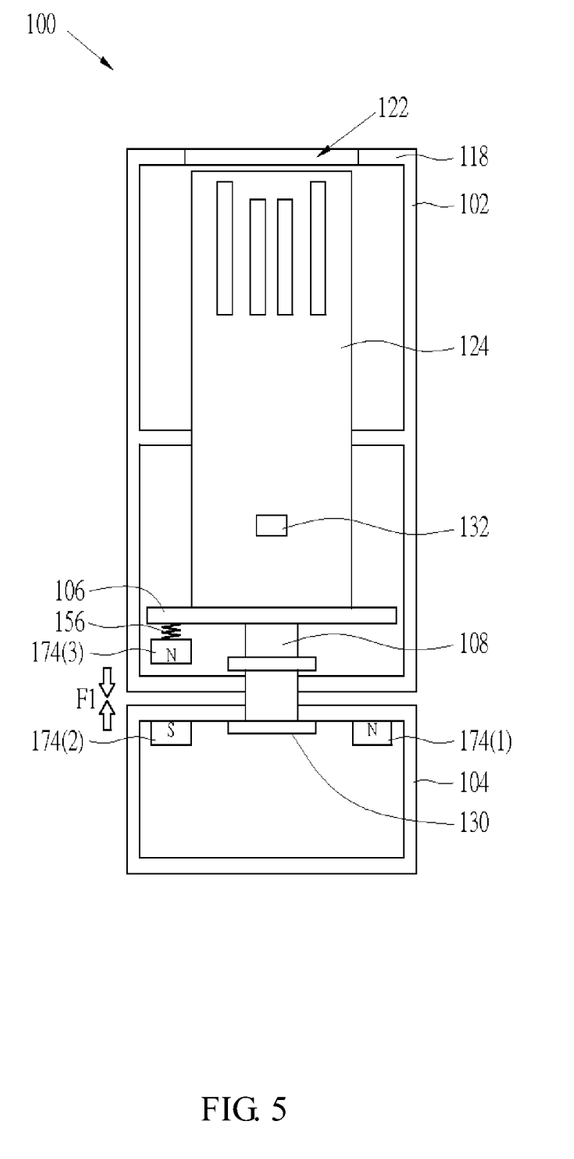
FIG. 5 is a perspective diagram showing the portable electronic device having the strike-buffering function in FIG. 1.

In addition, the magnet disposed in the base 106 also may be connected to the base 106 via the elastic component to achieve a strike-buffering design. Furthermore, FIG. 5 is a perspective diagram showing the portable electronic device having the strike-buffering function in FIG. 1. The base 106 of the memory disk 100 includes an elastic component 156, and the one end of the elastic component 156 is fixed to the third magnet 174(3). Thus, when the electronic component 124 is led into the casing 102 by the magnetic attraction F1 to make the connecting rod 108 reach a minimum compression length, due to the strike-buffering design of the elastic component 156, the base 106 and the electronic component 124 may not be damaged by the instantaneous striking force. Thus, the elastic component 156 has the function of protecting the electronic component 124.

The Second Embodiment

Figure 6:
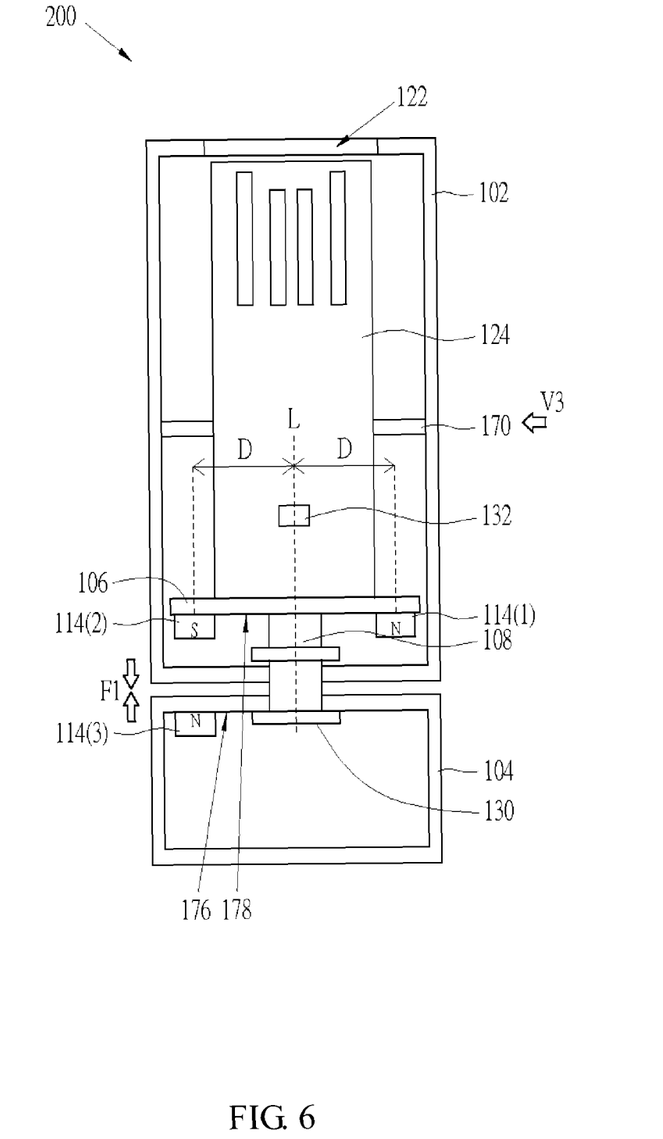
FIG. 6 is a perspective diagram showing the memory disk in the second embodiment of the invention.

FIG. 6 is a perspective diagram showing the memory disk in the second embodiment of the invention. Elements in the second embodiment use part of the reference numbers in the first embodiment. The difference between the second embodiment and the first embodiment is that the first magnet 114(1) and the second magnet 114(2) of the memory disk 200 in the second embodiment are disposed at the base 106, and the third magnet 114(3) is disposed in the rotating part 104. Furthermore, in the second embodiment, the first magnet 114(1) and the second magnet 114(2) are disposed at the surface 178 of the base 106 towards the rotating part 104. The third magnet 114(3) is disposed at the inner surface 176 of the rotating part 104 adjacent to the casing 102.

As shown in FIG. 6, the distance D between the first magnet 114(1) and the rotating axis L is the same as the distance D between the second magnet 114(2) 114 and the rotating axis L, and the path between the first magnet 114(1) and the second magnet 114(2) passes through the rotating axis L to make the central angle of the first magnet 114(1) and the second magnet 114(2) relative to the rotating axis is substantially 180 degrees. Thus, when one of the rotating part 104 and the casing 102 is rotated by 180 degrees relative to each other, the electronic component 124 is driven by the magnetic attraction or the magnetic repulsion to be led into the casing 102 and protected by the casing 102, or it may be led out of the casing 102 to be operated.

Figure 7:
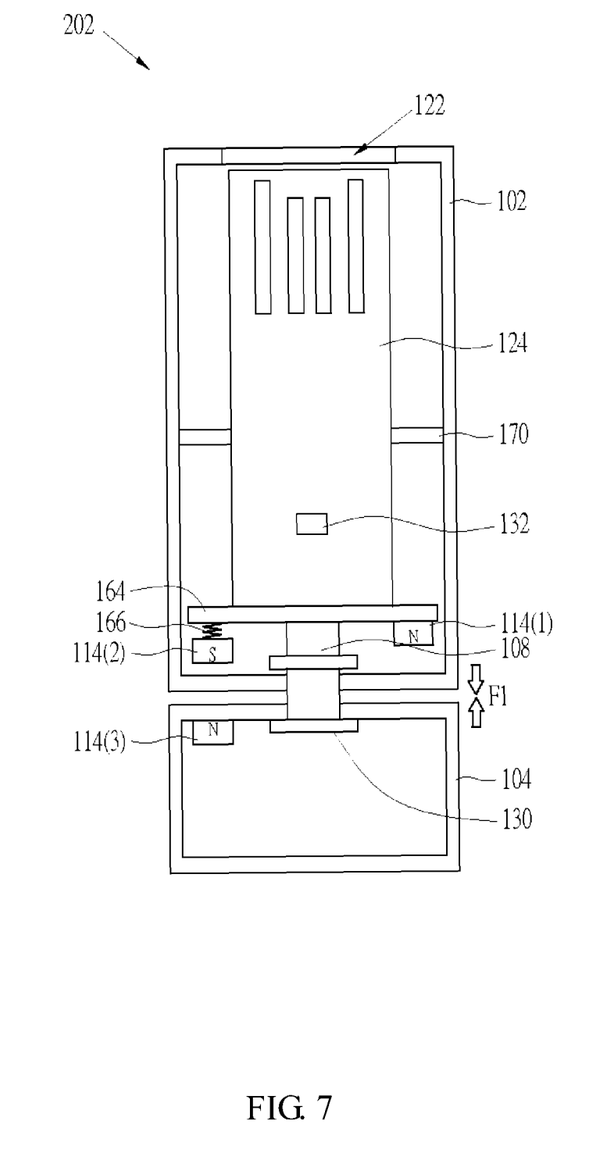
FIG. 7 is a perspective diagram showing the portable electronic device having the strike-buffering function in FIG. 6.

In addition, the magnet disposed at the base 106 also may be connected to base 106 via an elastic component to buffer the strike to avoid the damage of the electronic component 124 caused by the magnetic attraction F1. For example, FIG. 7 is a perspective diagram showing the portable electronic device having the strike-buffering function in FIG. 6. The base 164 of the memory disk 202 includes an elastic component 166, and one end of the elastic component 166 is fixed to the second magnet 114(2). Thus, when the electronic component 124 is driven by the magnetic attraction F1 to move into the casing 102 to make the connecting rod 108 reach the minimum compression length, as shown in FIG. 7, due to the elastic component 166 used as a buffer, the base 164 and the electronic component 124 are not damaged by the instantaneous striking force.

The Third Embodiment

Figure 8:
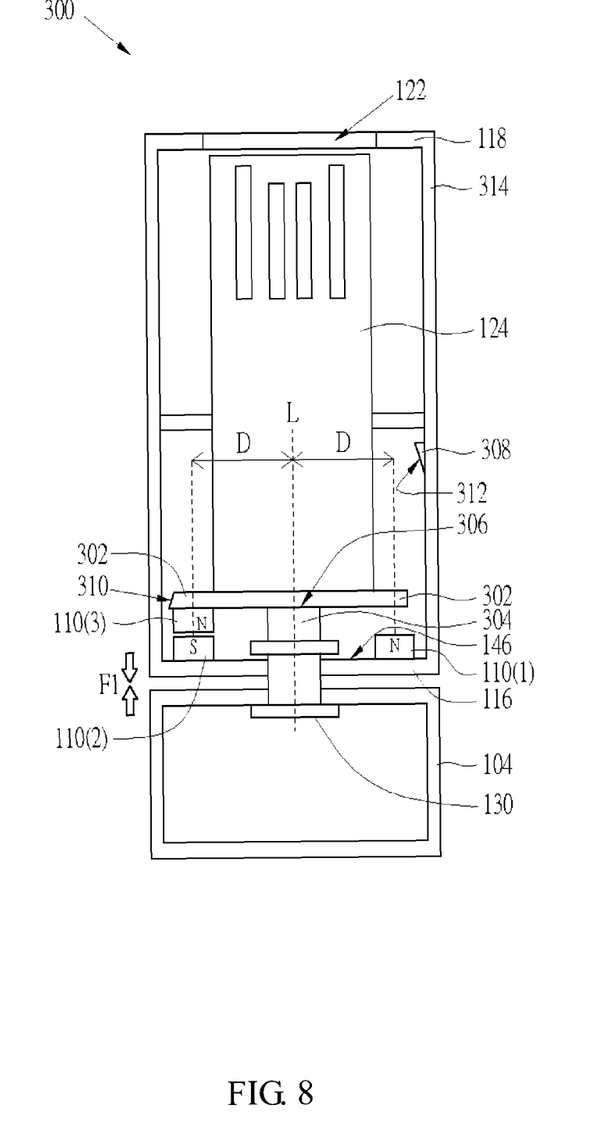
FIG. 8 is a perspective diagram showing the memory disk in the third embodiment of the invention.

FIG. 8 is a perspective diagram showing the memory disk in the third embodiment of the invention. Elements in the third embodiment also use some of the reference numbers in the first embodiment. The difference between the third embodiment and the first embodiment is that the first magnet 110(1) and the second magnet 110(2) of the memory disk 300 are disposed on an inner side wall 146 of the second side wall 116. The third magnet 110(3) is disposed in the base 302, and the third magnet 110(3) is disposed at a surface of the base 302, and the surface faces the inner side wall 146. The second end 306 of the connecting rod 304 in the embodiment is fixed to the base 302. In addition, the memory disk 300 includes a third blocking portion 308 and a fourth blocking portion 310. The third blocking portion 308 is fixed to the casing 314 and has a third inclined plane 312, and the fourth blocking portion is located at the edge of the base 302 of the casing 314, and it has an inclined surface corresponding to the third inclined plane 312.

Since the pivot unit 130, the connecting rod 304 and the base 302 are fixed to each other, when the rotating part 104 is rotated, the base 302 and the third magnet 110(3) are driven to be rotated.

As disclosed in the first embodiment, in FIG. 8, the distance D between the first magnet 110(1) and the rotating axis L is the same as the distance D between the second magnet 110(2) and the rotating axis L. In addition, the path of the first magnet 110(1) and the second magnet 110(2) passes through the rotating axis L to make the central angle of the first magnet 110(1) and the second magnet 110(2) relative to the rotating axis L is substantially 180 degrees. Thus, when one of the rotating part 104 and the casing 314 is rotated relative to each other by 180 degrees, the electronic component 124 is driven by the magnetic attraction or the magnetic repulsion and is led out to be electrically connected to the external device or led into the casing 314 and protected by the casing 314.

Figure 9:
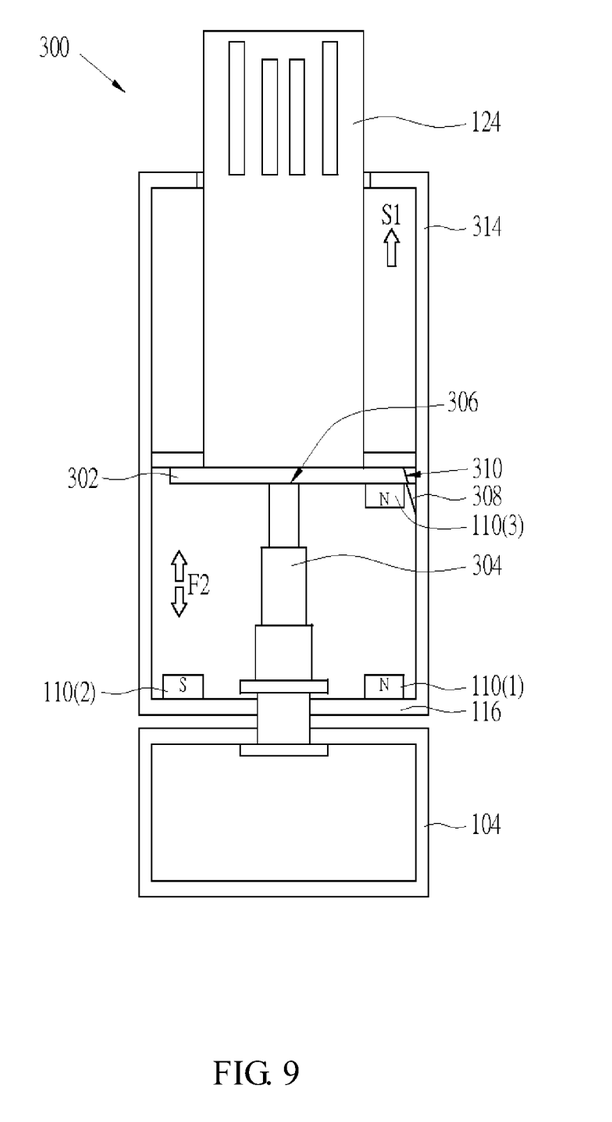
FIG. 9 is a perspective diagram showing the memory disk after rotating part in FIG. 8 is rotated by 180 degrees.

FIG. 9 is a perspective diagram showing the memory disk after rotating part in FIG. 8 is rotated by 180 degrees. When the rotating part 104 is rotated by 180 degrees, the third magnet 110(3) and the base 302 are driven to be rotated by 180 degrees. This makes magnetic repulsion F2 generated between the N-pole of the first magnet 110(1) and the N-pole of the third magnet 110(3). The magnetic repulsion F2 leads the electronic component 124 out of the casing 314. Thus, when the first magnet 110(1) corresponds to the third magnet 110(3), the third blocking portion 308 corresponds to the fourth blocking portion 310. Thus, when the base 106 is pushed out by the magnetic repulsion F2, the fourth blocking portion 310 is forced to pass the third blocking portion 308 on the casing 314 along the direction S1. When the fourth blocking portion 310 passes the third blocking portion 308, as shown in FIG. 9, the third blocking portion 308 may block the fourth blocking portion 310. Thus, when the electronic component 124 is inserted into an outside socket, it is not pushed into the casing 314 and thus it can be smoothly connected to the external outside socket.

The Fourth Embodiment

Figure 10A:
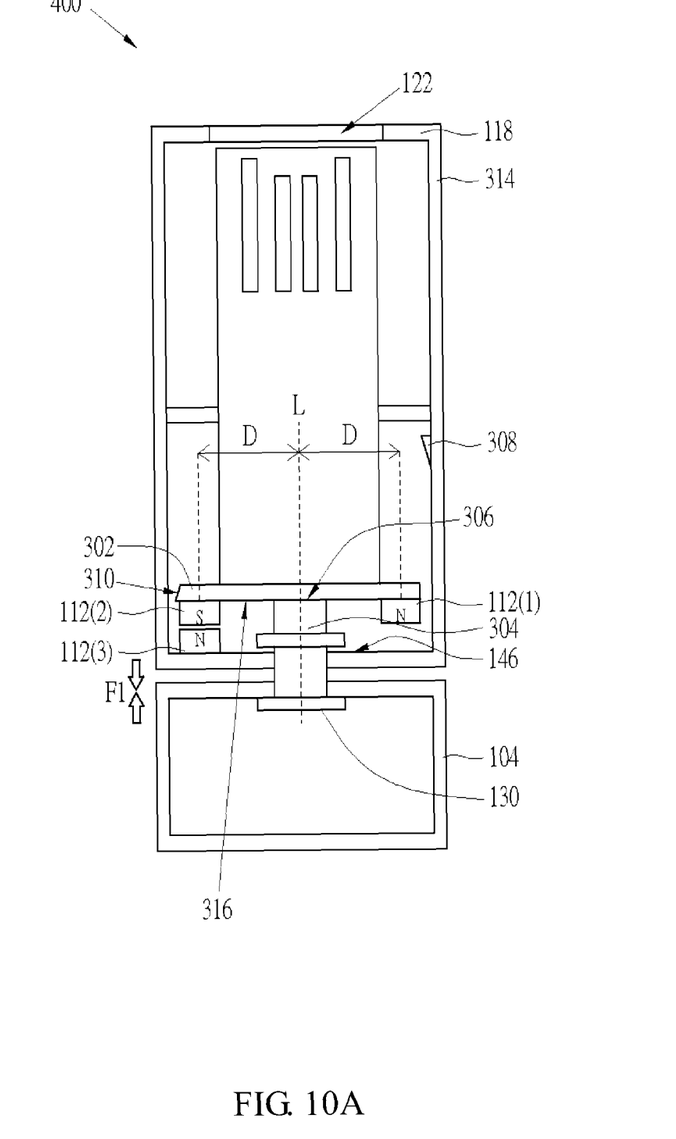
FIG. 10A is a perspective diagram showing the memory disk in the fourth embodiment of the invention.

FIG. 10A is a perspective diagram showing the memory disk in the fourth embodiment of the invention. The elements in the fourth embodiment also use some of the reference numbers in the third embodiment. The difference between the fourth embodiment and the third embodiment is that the first magnet 112(1) and the second magnet 112(2) in the memory disk 400 in the fourth embodiment are disposed at the surface 316 of the base 302 towards the inner side wall 146, and the third magnet 112(3) is disposed at the inner side wall 146 of the casing 314.

As disclosed in the third embodiment, the distance D between the first magnet 112(1) and the rotating axis L is the same as the distance D between the second magnet 112(2) and the rotating axis L, and the path between the first magnet 112(1) and the second magnet 112(2) passes through the rotating axis L to make the central angle of the first magnet 174(1) and the second magnet 174(2) relative to the rotating axis L is substantially 180 degrees. Thus, when one of the rotating part 104 and the casing 314 is rotated relative to each other by 180 degrees, the electronic component 124 is driven by the magnetic attraction or the magnetic repulsion and is led into the casing 314 to be protected by the casing 314 or led out of the casing 314 to be operated.

Figure 10B:
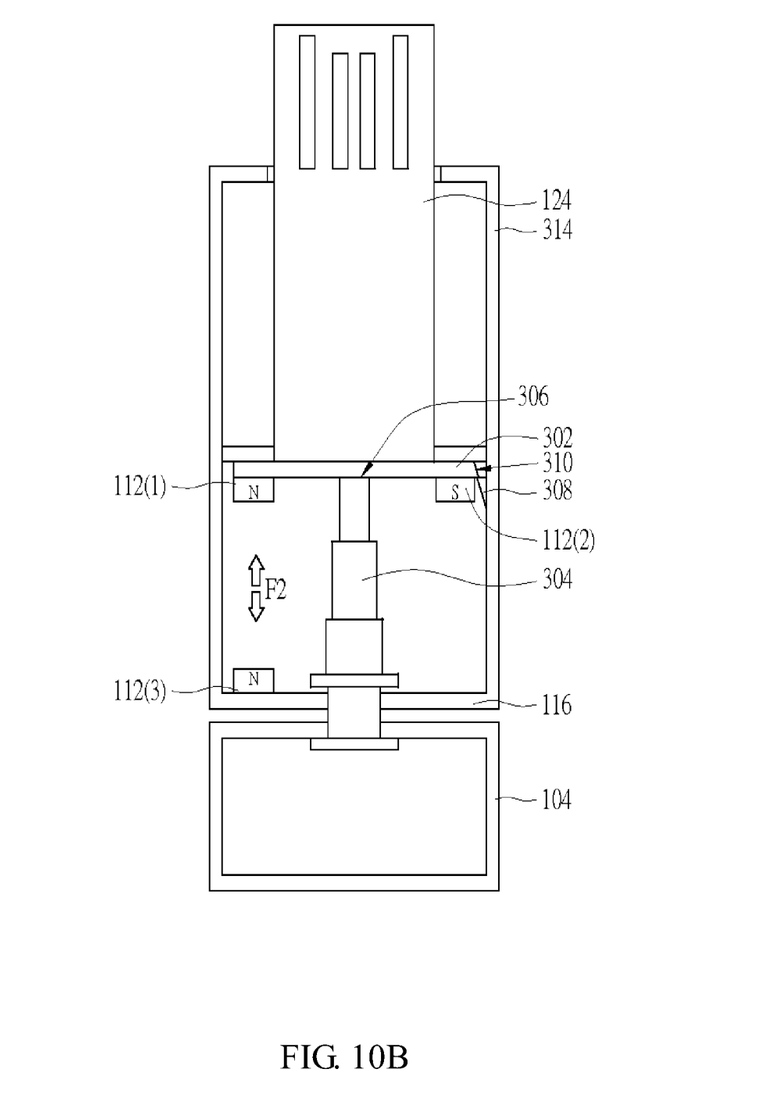
FIG. 10B is a schematic diagram showing that the electronic component in FIG. 10A is led out of the casing.

FIG. 10B is a schematic diagram showing that the electronic component in FIG. 10A is led out of the casing. When the rotating part 104 in FIG. 10A is rotated by 180 degrees, the N-pole of the first magnet 112(1) corresponds to the N-pole of the third magnet 112(3) to generate magnetic repulsion F2, and the magnetic repulsion F2 leads the electronic component 124 out of the casing 314.

Figure 11:
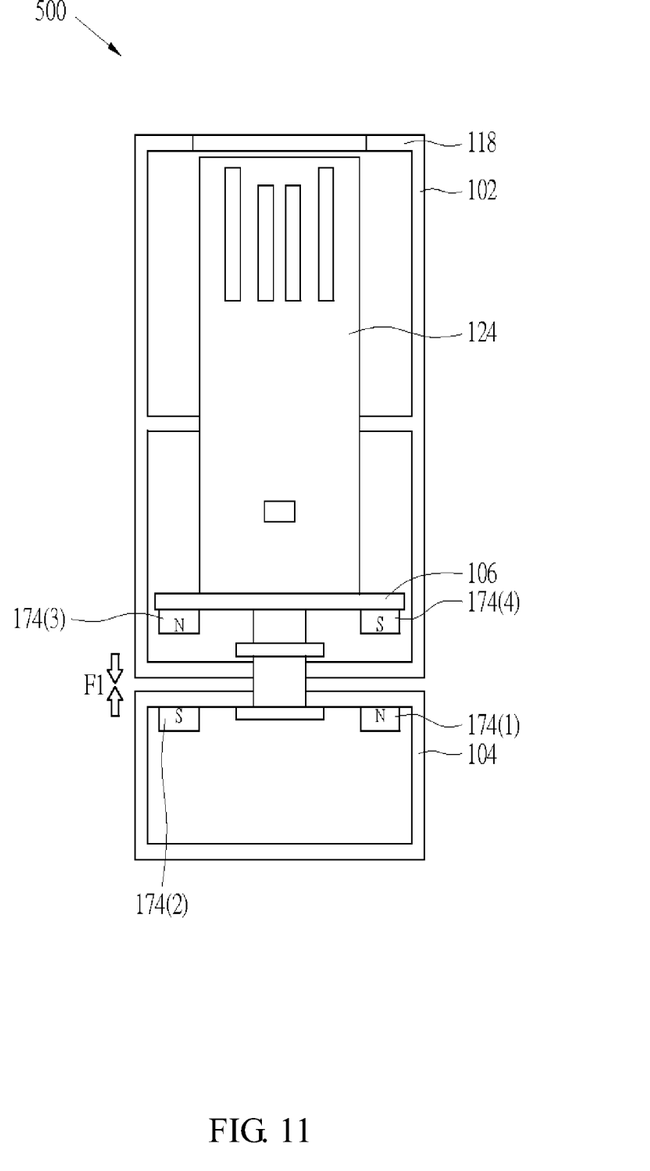
FIG. 11 is a schematic diagram showing the memory disk in FIG. 1 further including a fourth magnet.

In addition, although in the embodiments, the number of the magnets is three, in other embodiments, the number of the magnets may be more than three. For example, FIG. 11 is a schematic diagram showing the memory disk in FIG. 1 further including a fourth magnet. The difference between the memory disk 500 and the memory disk 100 is that the memory disk 500 further includes a fourth magnet 174(4). The fourth magnet 174(4) and the third magnet 174(3) are fixedly disposed in the casing 102, and the magnetism of the fourth magnet 174(4) is different from the magnetism of the third magnet 174(3). Thus, the magnetic force increases, and the speed for leading in and leading out the electronic component 124 also increases. Similarly, in the second to the fourth embodiments, the fourth magnet 174(4) also may be disposed, and the disposing mode is shown in FIG. 11 in which the fourth magnet 174(4) and the third magnet 174(3) are disposed in the same element such as the base, the rotating part or the second side wall.

In the portable electronic device in the embodiments of the invention, by the rotation of the rotating part, magnets are rotated along with the rotating part to correspond to another magnet having different magnetism to generate magnetic attraction or magnetic repulsion. Thus, the electronic component is led into or led out of the casing.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable electronic device, comprising:
 a casing having an opening, the casing including:
  a base slidably disposed in the casing, having an upper surface and a lower surface opposed to the upper surface; and
  an electronic component disposed on the upper surface of the base;
 a rotating part;
 a pivot unit pivotally connected to the casing and the rotating part; and
 a magnet set, including:
  a first magnet and a second magnet disposed at the lower surface of the base, wherein the magnetism of the first magnet is different from the magnetism of the second magnet;
  a third magnet disposed at the other one of the base and the rotating part, wherein the magnetism of the third magnet is the same as one of the magnetism of the first magnet and the magnetism of the second magnet,
 wherein when the rotating part is rotated relative to the casing, the magnet set generates magnetic attraction or magnetic repulsion to lead the electronic component into the casing or out of the casing.

2. The portable electronic device according to claim 1, wherein the magnet set further comprises:
 a fourth magnet disposed at the other one of the base and the rotating part, wherein the magnetism of the fourth magnet is different from the magnetism of the third magnet.

3. The portable electronic device according to claim 1, further comprising a connecting rod having a first end and a second end corresponding to each other, wherein the first end is fixedly connected to the rotating part and the second end is connected to the base.

4. The portable electronic device according to claim 3, wherein the first magnet and the second magnet are disposed in the rotating part, the third magnet is disposed at the base, and the second end of the connecting rod is connected to the base and is capable of rotating relative to the base.

5. The portable electronic device according to claim 3, wherein the third magnet is disposed in the rotating part, the first magnet and the second magnet are disposed at the base, and the second end of the connecting rod is connected to the base and is capable of rotating relative to the base.

6. The portable electronic device according to claim 3, wherein the casing comprises a first blocking portion, the connecting rod includes a second blocking portion, and the second blocking portion is used to block the first blocking portion.

7. The portable electronic device according to claim 3, wherein the opening is disposed at a first side wall of the casing, the casing has a second side wall corresponding to the first side wall, the second side wall has a through hole, and the pivot unit comprises:
 a first connecting portion and a second connecting portion which are disposed correspondingly, wherein the first connecting portion and the second connecting portion are respectively located in the casing and the rotating part, the first connecting portion is fixedly connected to the first end of the connecting rod, the second connecting portion is fixedly connected to the rotating part, and the first connecting portion is used to abut against the second side wall; and a pivot passing through the through hole, wherein two ends of the pivot are fixedly connected to the first connecting portion and the second connecting portion, respectively.

8. The portable electronic device according to claim 1, wherein the third magnet is disposed at the base, and the base comprises:

an elastic component whose one end is fixedly connected to the third magnet.

9. The portable electronic device according to claim 1, wherein the first magnet and the second magnet are located at the base, and the base comprises:

an elastic component whose one end is fixedly connected to the second magnet.

10. The portable electronic device according to claim 1, wherein a distance between the first magnet and a rotating axis of the rotating part, a distance between the second magnet and the rotating axis of the rotating part, and a distance between the third magnet and the rotating axis of the rotating part are the same.

11. A portable electronic device, comprising:

a casing having a second side wall and an opening, the casing including:

a base slidably disposed in the casing, having an upper surface and a lower surface opposed to the upper surface; and an electronic component disposed on the upper surface of the base;

a rotating part;

a pivot unit pivotally connected to the casing and the rotating part; and a magnet set, including:

a first magnet and a second magnet disposed at the lower surface of the base, wherein the magnetism of the first magnet is different from the magnetism of the second magnet; and a third magnet disposed at the other one of the base and the second side wall, wherein the magnetism of the third magnet is the same as one of the magnetism of the first magnet and the magnetism of the second magnet, wherein when the rotating part is rotated relative to the casing, the magnet set generates magnetic attraction or magnetic repulsion to lead the electronic component into the casing or out of the casing.

12. The portable electronic device according to claim 11, wherein the magnet set further comprises:

a fourth magnet disposed at the other one of the base or the second side wall, wherein the magnetism of the fourth magnet is different from the magnetism of the third magnet.

13. The portable electronic device according to claim 11, further comprising a connecting rod having a first end and a second end corresponding to each other, wherein the first end is fixedly connected to the rotating part and the second end is connected to the base.

14. The portable electronic device according to claim 13, wherein the first magnet and the second magnet are disposed in the second side wall, the third magnet is disposed at the base, and the second end of the connecting rod is fixedly connected to the base.

15. The portable electronic device according to claim 13, wherein the third magnet is disposed on the second side wall, the first magnet and the second magnet are disposed at the base, and the second end of the connecting rod is fixedly connected to the base.

16. The portable electronic device according to claim 13, wherein the second side wall has a through hole, and the pivot unit comprises:

a first connecting portion and a second connecting portion which are disposed correspondingly, the first connecting portion and the second connecting portion are respectively located in the casing and the rotating part, the first connecting portion is fixedly connected to the first end of the connecting rod, the second connecting portion is fixedly connected to the rotating part, and the first connecting portion is used to abut against the second side watt; and a pivot passing through the through hole, wherein two ends of the pivot are fixedly connected to the first connecting portion and the second connecting portion.

17. The portable electronic device according to claim 11, wherein the casing comprises a third blocking portion, the base includes a fourth blocking portion, and the third blocking portion is used to block the fourth blocking portion.

18. The portable electronic device according to claim 11, wherein the third magnet is disposed at the base, and the base comprises:

an elastic component whose one end is fixedly connected to the third magnet.

19. The portable electronic device according to claim 11, wherein the first magnet and the second magnet are located at the base, and the base comprises:

an elastic component whose one end is fixedly connected to the second magnet.

20. The portable electronic device according to claim 11, wherein a distance between the first magnet and a rotating axis of the rotating part, a distance between the second magnet and the rotating axis of the rotating part aid a distance between the third magnet and the rotating axis of the rotating part are the same.

* * * * *